A. D. WILT, Jr.
STEERING REACH ROD.
APPLICATION FILED MAY 14, 1912.
1,117,123.
Patented Nov. 10, 1914
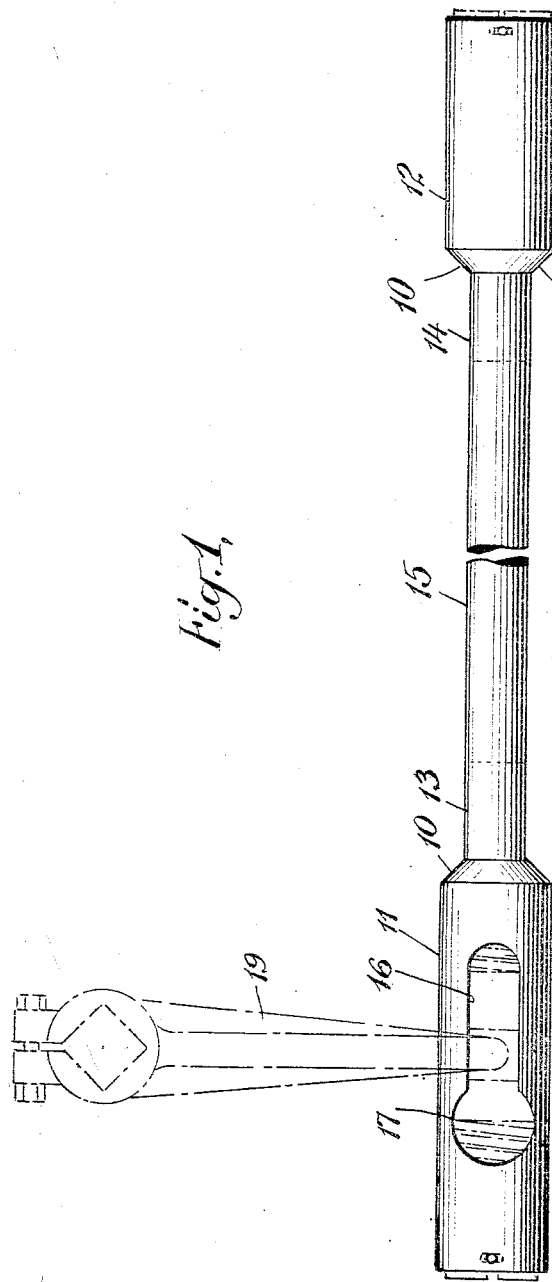
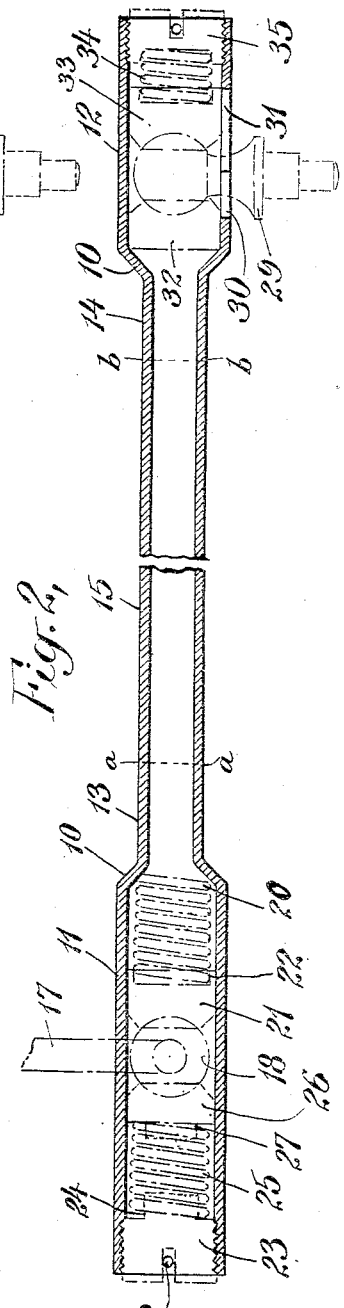
WITNESSES:
Felix Thomas
Wm Bohleber
INVENTOR
A. D. Wilt Jr.
BY
Kerr Page Cooper & Hayward
ATTORNEYS

UNITED STATES PATENT OFFICE.

ABRAM D. WILT, JR., OF DETROIT, MICHIGAN.

STEERING-REACH ROD.

1,117,123.

Specification of Letters Patent.

Patented Nov. 10, 1914.

Original application filed April 27, 1910, Serial No. 557,969. Divided and this application filed May 14 1912. Serial No. 697,188.

*To all whom it may concern:*

Be it known that I, ABRAM D. WILT, Jr., a citizen of the United States of America, residing at Detroit, county of Wayne, and State of Michigan, have invented certain new and useful Improvements in Steering-Reach Rods, of which the following is a full, clear, and exact description.

This invention is a division of my application Serial No. 557,969, filed April 27, 1910, and relates to an improvement in steering reaches, radius rods, torsion rods, tie rods, etc., and has among its objects to provide a form of device which shall be simple and economical to manufacture and at the same time shall minimize the dangers of breakage which not infrequently occur in devices of this character.

The invention in its broad aspects resides in a reach formed of a continuous piece of tubing bent inward at an intermediate point to form a shoulder which is adapted to serve as a seat for a spring in combination with means for connecting said reach to a crank or other suitable steering means through a slot or aperture in said reach.

Referring to the drawings, Figure 1 is a side elevation of one form of the device, being in this instance a steering reach rod, and showing the same connected to a steering crank arm, the latter indicated in dotted lines. Fig. 2 is a longitudinal sectional view of the parts shown in Fig. 1.

The steering reach comprises a rod which resembles, in its finished form, a continuous piece of tubing from one end to the other but is reduced by any suitable method between the ends thereof as indicated at 10. The portions of larger diameter are indicated at 11 and 12 while the portions of smaller diameter are indicated at 13 and 14. Between the portions of smaller diameter and welded or otherwise secured thereto, is the portion 15. Referring to the connection shown at the left-hand side of the figures the end portion 11 is provided with a slot 16 having an aperture 17 sufficiently large to receive the ball 18 of the crank arm 19 therethrough. The shoulder 10 of the end portion 11 is adapted to serve as a seat for the spring 20 and between the ball 18 and the spring is a block 21 having a spherical seat on one side thereof for said ball and a projection 22 on the opposite side thereof. The portion 12 is screw-threaded interiorly at the outer end thereof to receive a plug 23 provided with a projection 24. One end of the spring 25 abuts the said plug 23 while the other end of said spring abuts a companion block 26 provided with a projection 27 on one side thereof, a spherical seat being provided on the other side thereof for the ball 18. The assembled relation is clearly indicated in the figures and when in position, with the ball within the slot, and the plug 23 screwed up as shown, accidental removal of the ball therefrom is obviated. For example if the spring 25 be broken the projection on the block will retreat outwardly until the same contacts with the projection 24 on the plug 23 but the latter is screwed inwardly far enough to prevent a sufficient outward movement of the block to uncover the enlarged portion 17 of the slot. A pin 28 is employed to lock the plug 23 in its adjusted relation. It will therefore be obvious from the construction shown that the removal of the ball from the slot can be accomplished by unscrewing the plug 23 sufficiently to allow the block plunger 26 to uncover the aperture 17. It is obvious that the projections 27 and 24 on the block and plug are not essential. It is sufficient if the construction is such as to prevent the block 26 from uncovering the aperture 17 enough to allow the ball 18 to pass outwardly therethrough. The opposite end 12 of the reach and the connection therefor are quite similar to the end 11 and its associated parts. The ball-arm 29 which forms, for example, a part of the connections with the running wheels, is inserted through the enlarged portion 31 of the slot 30. The blocks 32 and 33 correspond to blocks 21 and 26 respectively while the spring 34 and plug 35 correspond to spring 25 and plug 26 previously described. It will therefore be apparent that this modification differs from the construction shown at the opposite end of the rod by the omission of a spring between the blocks 32 and the shoulder 10, the block itself resting in the view upon the said shoulder. It is unnecessary to go into further details with regard to these connections as they form the subject matter of my copending application above referred to and are only briefly described herein with a view to convey a better understanding of the invention forming the basis of this application.

On account of the usual length of reach rods, torsion rods, radius rods, etc., it must be remembered that portions must necessarily be welded together or united by some other suitable process to produce a rod of sufficient length. This is one of the chief impediments in the manufacture of the old types of reach rods.

In the manufacture of the device the walls of the continuous piece of tubing are bent inwardly at an intermediate point 10 to form a shoulder by the converging of the said walls, the converging portion comprising the continuous walls of the tube connecting the intermediate portion of the tubular rod of smaller diameter and the end portions of larger diameter. In proximity to the converging portions 10 the tubular portions of smaller diameter are welded at a—a and b—b to the portion 15 in order, as stated before, that a rod of sufficient length can be produced.

Among the advantages of a tubing constructed as above described I now proceed to detail the more important ones. The steel tubing is far superior to and stronger than the socket tubing made from bar stock and avoids the seams or other defects of cold rolled steel. A weld made from tubing to tubing is much stronger than a weld from cold rolled steel to tubing, due to the fact that the former materials are homogeneous. The reducing of the tubing in the manner described makes it possible to gain accuracy in diameter of the reduced portion of the tubing such as is desirable and most essential for proper welding. The tube can be looked through to ascertain whether or not the weld is properly made. The rod being made essentially in one piece materially simplifies previous constructions. The fact that the rod is of continuous steel tubing throughout not only conserves lightness but the strength in proportion to the quantity of material used is maximum, and the cost of manufacture is minimum.

The preferred method of bending the walls of the tube inwardly at an intermediate point to form a shoulder is by swaging. It is to be understood, however, that wherever the term "welding" is used in the description and claims, I mean any process by which the steel tubings can be integrally united to accomplish substantially the purposes and functions of the welding process.

What I claim is:

1. A reach rod connection, comprising a crank arm with a ball thereon and a reach rod formed from pieces of tubing, the walls of one of said pieces of tubing bent inwardly at an intermediate point to form a shoulder, and the contracted portion of said piece of tubing welded to another of said pieces of tubing whereby a seat for a spring is formed by said inwardly bent portion and the welded joint may be inspected from both the interior and the exterior of said tubing.

2. A steering reach rod connection, comprising a crank arm with a ball thereon and a reach rod formed from pieces of tubing, the walls of one of said pieces of tubing bent inwardly at an intermediate point by swaging to form a shoulder, and the contracted portion of said piece of tubing welded to another of said pieces of tubing whereby a seat for a spring is formed by said inwardly bent portion and the welded joint may be inspected from both the interior and exterior of said tubing.

3. A steering reach rod and connection comprising a steering crank arm with ball thereon, a reach rod formed from a continuous piece of tubing having the walls thereof bent inwardly at an intermediate point to form a shoulder by the converging of said walls, said converging portion comprising the continuous walls of the tube connecting the intermediate portion of the tubular rod of smaller diameter and the end portion of larger diameter, said end portion being formed with an aperture therein to permit socketing the ball and with an extended slot for the lateral shifting of the ball arm, retaining blocks located within the tube on each side of the ball; a spring contained in the tubing, seated at one end upon said shoulder and at the other end upon the adjacent retaining block, and means for maintaining the blocks and spring in said tubular rod substantially as and for the purpose described.

4. A connection, comprising an arm with a ball thereon, a rod formed from a continuous piece of tubing having the walls thereof bent inwardly at an intermediate point to form a shoulder by the converging of said walls, said converging portion comprising the continuous walls of the tube connecting the portion of the tubular rod of smaller diameter and the end portion of larger diameter, said end portion being formed with an aperture therein to permit socketing of the ball and having an extended slot for the lateral shifting of the ball arm, retaining means located within the tube on each side of the ball, and resilient means contained in the tubing seated at one end upon said shoulder and acting at the other end upon the ball of the arm substantially as described and for the purpose set forth.

5. A steering reach rod, comprising end portions, and an intermediate portion of tubing, one of said end portions consisting of tubing bent inwardly at an intermediate point to form a shoulder which is adapted to serve as a seat for a spring and also to form a part of smaller diameter, which is welded to the intermediate tubular portion connecting the end portions, and through which the welded joint can be inspected from the interior.

6. A steering reach rod, comprising end portions of steel tubing and an intermediate portion also of steel tubing, each of said end portions bent inwardly at an intermediate point to form parts of larger and smaller diameters, each of the inwardly bent or converging portions connecting the parts of larger and smaller diameter and forming a shoulder which is adapted to serve as a seat for a spring, and the intermediate tubular portion of said reach rod being welded to each of said parts of smaller diameter.

7. A steering reach rod comprising pieces of steel tubing, the walls of one of said pieces of tubing being bent inwardly at an intermediate point to form a shoulder and the contracted portion of said piece of tubing welded to another of said pieces of steel tubing, whereby a seat for a spring is formed by said inwardly bent portion and a welded joint is effected between homogeneous metals.

In testimony whereof I affix my signature in the presence of two subscribing witnesses.

ABRAM D. WILT, Jr.

Witnesses:
J. B. HAYWARD,
ANNA MALLOY.